April 21, 1931.  C. F. M. VAN BERKEL  1,801,650
METHOD OF AND APPARATUS FOR WRAPPING FOODSTUFFS
Filed Jan. 18, 1928
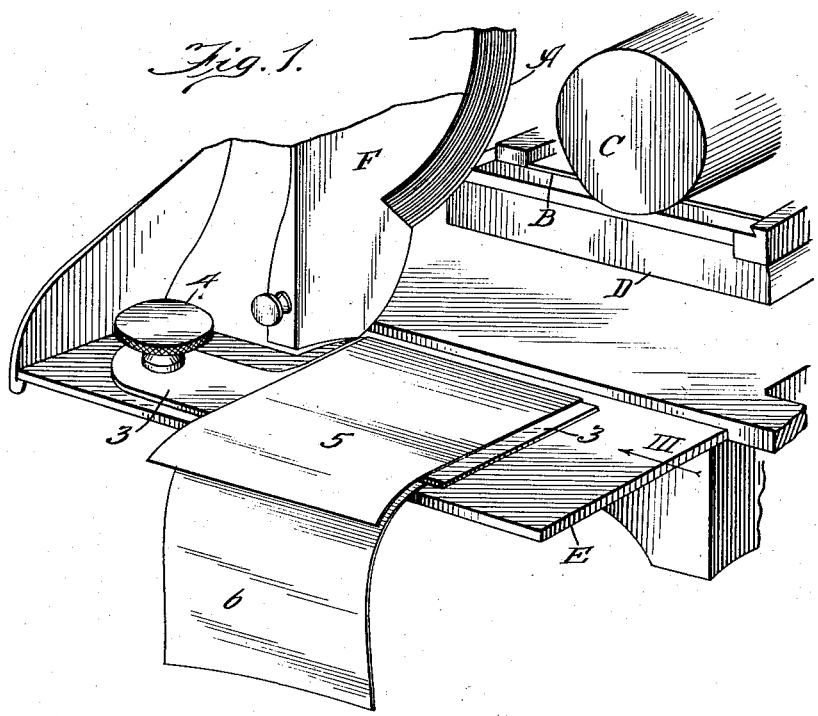
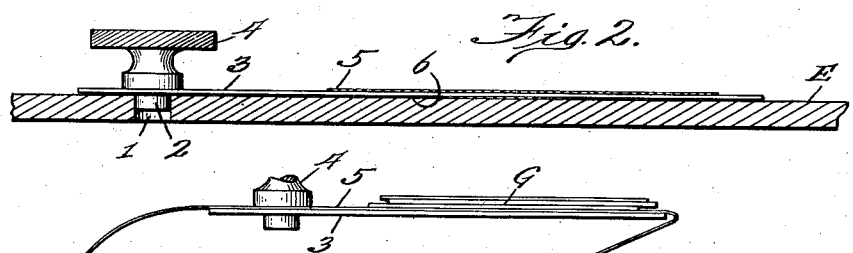

Patented Apr. 21, 1931

1,801,650

REISSUED

UNITED STATES PATENT OFFICE

CORNELIS F. M. VAN BERKEL, OF WASSENAAR, NETHERLANDS, ASSIGNOR TO U. S. SLICING MACHINE COMPANY, OF LA PORTE, INDIANA, A CORPORATION OF INDIANA

METHOD OF AND APPARATUS FOR WRAPPING FOODSTUFFS

Application filed January 18, 1928, Serial No. 247,511, and in Great Britain February 25, 1927.

This invention relates to a method of and apparatus for wrapping foodstuffs, particularly slices of meat, in a hygienic manner, the method and apparatus being for employment in connection with weighing scales or slicing machines.

At present, the method usually adopted has consisted in placing a flat sheet of wrapping material (e. g. paper) upon the receiving platform of the weighing scale or slicing machine and depositing the food on the sheet. It has been found that it is rather difficult to remove this sheet with the food thereon from the platform, without handling the food, owing to the suction and friction between the sheet and the platform.

The object of this invention is to obviate the above disadvantage, and to this end the invention consists in inserting a supporting member between upper and lower portions of a folded wrapping sheet and positioning said member, with the sheet, upon the slice-receiving platform and, when the food to be wrapped is deposited upon the upper portion of the sheet, moving the member clear of the platform and simply turning the lower portion of the sheet over the top of the food, whereafter the latter can be wrapped in the sheet in usual manner.

The folded sheet may be placed initially on the platform and the supporting member thereafter positioned between the upper and lower portions of the sheet prior to the slicing of the food.

The wrapping sheet may be folded in such a manner that the lower portion thereof extends beyond the upper portion.

The supporting member comprises a flat plate, or the like, fitted with a handle and coacting means may be provided on the member and on the platform for insuring that the member will be positioned correctly for receiving the food to be wrapped.

One embodiment of the apparatus for carrying out the invention is illustrated by way of example in the accompanying drawing in which—

Fig. 1 is a fragmentary perspective view of a slicing machine showing a wrapping sheet positioned for reception of the food to be sliced by the slicing knife, only so much of the machine as is necessary for fully understanding the invention being shown;

Fig. 2 is a section of the slice-receiving platform with a wrapping sheet and supporting member positioned thereon;

Fig. 3 is a view of the supporting member removed from the machine and with the wrapping sheet and slices thereon, the view being taken in the direction of the arrow III of Fig. 1.

Referring to the drawing, the slicing machine therein shown is of well-known construction and comprises a rotary slicing knife A, a feed plate B on which the food C to be sliced is clamped, a reciprocatory carriage D adapted to carry the feed plate with the food thereon to and fro past the knife, and a platform E toward which the slices cut by the knife are directed by a slice deflector F.

The platform E has formed in it (Fig. 2) an aperture 1 into which can be inserted, as shown, a projection 2 on a flat plate 3 constituting a supporting member for the slices and provided with a handle 4. This plate 3 is shown interposed between upper and lower portions 5 and 6 of a folded wrapping sheet, the lower portion 6 being greater than the upper portion 5.

When the food is about to be sliced, the plate 3 is interposed between the portions 5 and 6 of a folded wrapping sheet and placed in position on the platform E, as shown in Fig. 1. When the requisite amount of food has been deposited in slices G near the fold upon the portion 5, the plate 3 is removed from the platform. The portion 6 is then turned, in a counterclockwise direction over the top of the food which can thereafter be wrapped in usual manner in the sheet.

This method of wrapping is particularly adaptable for use in connection with such meat slicing machines as are provided with so-called "meat stackers", such for example as make a partial revolution, the slices in such machines being spread automatically upon the wrapping sheet without handling. Further, it will be apparent that the slice-receiving platform E could be the platform of a weighing scale.

The projection 2 and aperture 1 could be polygonal so as to provide a definite position on the platform E for the plate 3.

In lieu of the plate 3 being adapted to be lifted entirely away from the platform E, it might be pivotally mounted on the platform so that it could be readily swung into or out of the position in which it receives the food or the position in which it is clear of the platform for permitting the food to be wrapped.

I claim:—

1. A method of wrapping and removing foodstuffs from apparatus having a food receiving platform, said method consisting of placing a strip of paper on said platform and placing a relatively thin rigid supporting member on said paper between the ends thereof, folding said strip of paper over the top surface of said member to provide a food receiving surface, depositing the food on said food receiving surface, moving said member clear of said platform, and folding said strip of paper back over the top of the food.

2. The method set forth in claim 1 in which said member is placed on said strip of paper nearer one end than the other.

3. A method of wrapping foodstuffs consisting of folding a strip of wrapping paper, inserting a rigid supporting member between the folds of said strip of wrapping paper, placing the paper and its supporting member on a supporting surface with one of the folded portions of the paper below and one above said supporting member, placing the food on the paper covering the top surface of said supporting member, moving said supporting member away from said supporting surface, and folding the portion of the paper disposed at the lower side of said member back over the top of the food.

4. A method of wrapping foodstuffs consisting of folding a strip of wrapping paper nearer one end than the other, inserting a rigid supporting member between the folds of said strip of wrapping paper, placing the paper and its supporting member on a supporting surface with the longer of said folded portions of said paper disposed below said supporting member and with the shorter of said folded portions disposed over the top surface of said supporting member, placing the food on said shorter portion, removing said supporting member from said supporting surface, folding the portion of the paper disposed at the lower side of said member back over the top of the food and finally wrapping the food in the usual manner.

5. In an apparatus having a food receiving surface the combination of an auxiliary food receiver mounted adjacent said receiving surface, said auxiliary food receiver being adapted to support a folded piece of wrapping paper and being interposed between the folds thereof.

6. In an apparatus having a food receiving surface the combination of an auxiliary food receiver mounted on said receiving surface in a position to receive food thereon and to permit its removal without handling, said auxiliary food receiver comprising a relatively thin rigid member adapted to support a sheet of wrapping paper on one side thereof with the edge of said sheet extending over the edge of said rigid member and across the surface thereof.

7. In an apparatus having a food receiving surface of an auxiliary food receiver movably mounted on said receiving surface and in a position to receive food thereon, said auxiliary food receiver comprising a relatively thin rigid member adapted to support a sheet of wrapping paper thereon with one portion of said sheet of wrapping paper extending over the edge of said rigid member and across the surface thereof to form a food receiving surface for said auxiliary food receiver, said member having a handle thereon to facilitate the removal of said auxiliary food receiver from said food receiving surface.

8. In an apparatus having a food support with a food receiver thereon of an auxiliary food receiver mounted on said receiving surface in a position to receive food thereon and to permit its removal without handling, said auxiliary food receiver comprising a relatively thin rigid member having upper and lower surfaces and an edge portion, said rigid member being adapted to receive a sheet of wrapping material with the sheet of said material extending over and under said rigid member, said member having means thereon to engage said support and position said auxiliary food receiver on said support.

9. In an apparatus for slicing foodstuffs the combination with a support for the substance to be sliced of a slicing knife movably mounted with respect to said support and a slice receiving member removably mounted in a position adjacent said slicing knife to receive slices as they are cut by said knife, said member having the upper and lower surfaces thereof unobstructed so as to permit a sheet of wrapping material to extend above and below said member, the portion of said wrapping paper above said member being adapted to receive the slices as they are cut from the substance on said support, said member having a projection thereon adapted to engage a recess in a supporting member so as to position said food receiver in a predetermined position relatively to said slicing knife.

10. In an apparatus for wrapping foodstuffs the combination with a support for the substance being sliced of a removable food receiver mounted on a support in predetermined relation to said substance support, a slicing knife adapted to cut slices from the substance on said substance support and deposit the same on said food receiver, said receiver comprising a rigid member having upper and lower surfaces which are unobstructed so as to permit a sheet of wrapping material to be disposed over and under said member, that portion of the wrapping material which is above said member being adapted to receive the slices as they are cut from the substance, said member being pivoted so as to enable one to move said member out of its slice receiving position.

11. The method of wrapping foodstuffs which comprises inserting a substantially rigid member between the folds of a sheet of wrapping material and placing said sheet of wrapping material in a position relatively to the slicing knife of a slicing machine such that said wrapping material will receive the slices as they are cut from the substance by said slicing knife.

In testimony whereof I have signed my name to this specification on this 21st day of December A. D. 1927.

CORNELIS F. M. van BERKEL.